US010670370B2

(12) United States Patent
Liao

(10) Patent No.: US 10,670,370 B2
(45) Date of Patent: Jun. 2, 2020

(54) LASER SIGHTING DEVICE

(71) Applicant: GUAY GUAY TRADING CO., LTD., Changhua County (TW)

(72) Inventor: Yin-Hsi Liao, Changhua County (TW)

(73) Assignee: GUAY GUAY TRADING CO., LTD., Changhua County (TW)

( * ) Notice: Subject to any disclaimer, the term of this patent is extended or adjusted under 35 U.S.C. 154(b) by 217 days.

(21) Appl. No.: 15/913,863

(22) Filed: Mar. 6, 2018

(65) Prior Publication Data

US 2019/0277602 A1    Sep. 12, 2019

(51) Int. Cl.
*F41G 1/35* (2006.01)
*F21V 21/30* (2006.01)
*F41G 11/00* (2006.01)

(52) U.S. Cl.
CPC ............... *F41G 1/35* (2013.01); *F21V 21/30* (2013.01); *F41G 11/001* (2013.01)

(58) Field of Classification Search
CPC . F41G 1/34; F41G 1/35; F41G 11/001; F21V 21/145; F21V 21/30
See application file for complete search history.

(56) References Cited

U.S. PATENT DOCUMENTS

| | | | | |
|---|---|---|---|---|
| 2,456,214 | A * | 12/1948 | Poe | F41G 1/08 42/137 |
| 4,939,863 | A * | 7/1990 | Alexander | F41G 1/35 33/265 |
| 5,323,555 | A * | 6/1994 | Jehn | F41G 1/36 42/115 |
| 5,694,713 | A * | 12/1997 | Paldino | F41G 1/35 33/DIG. 21 |
| 6,499,247 | B1 * | 12/2002 | Peterson | F41G 1/54 42/116 |
| 7,331,137 | B2 * | 2/2008 | Hsu | F41G 1/35 42/114 |
| 7,726,061 | B1 * | 6/2010 | Thummel | F41G 11/001 42/115 |
| 7,748,127 | B1 * | 7/2010 | Cosimano | G01C 15/002 33/286 |
| 10,184,756 | B1 * | 1/2019 | McCauley | F41G 1/35 |

* cited by examiner

*Primary Examiner* — Gabriel J. Klein
(74) *Attorney, Agent, or Firm* — Leong C. Lei

(57) ABSTRACT

The laser sighting device provides a first operation member and a second operation member to achieve vertical and lateral adjustment of the sighting device's laser beam without a tool. Spiral flanges within the first and second operation members provide gradual shift of the laser beam, and the embedment of elastic elements into two rings of indentations on the first and second operation members provides stepwise fine adjustment to the laser beam.

10 Claims, 15 Drawing Sheets

10,670,370 B2

LASER SIGHTING DEVICE

BACKGROUND OF THE INVENTION

(a) Technical Field of the Invention

The present invention is generally related to laser sights for firearms, and more particular to a laser sighting device providing accurate adjustment without tools.

(b) Description of the Prior Art

A conventional infrared sight includes a casing, an infrared emitting element, an upper adjustment bolt running through the casing from above and touching the infrared emitting element, a spring positioned beneath the infrared emitting element, and lateral adjustment bolts running through the casing from the left and right sides of the casing, respectively, and touching the infrared emitting element. Usually a wrench or some hand tool is applied to the adjustment bolts so as to adjust the infrared lighting element and to align the laser sight and the firearm it is attached to. In addition to that the requirement for a hand tool is more troublesome, the adjustment can only be conducted by instinct and therefore is less accurate and more time consuming.

SUMMARY OF THE INVENTION

The objective of the present invention is to provide a laser sighting device that can be adjusted accurately and without tool.

To achieve the objective, the laser sighting device includes a laser member. The laser member includes a first prop pin and an opposing first elastic element positioned adjacent to a front end, and a second prop pin and an opposing second elastic element adjacent to a rear end, of the laser member. The laser member is moveably housed in a housing member. The housing member is housed in a positioning member that includes a fastening mechanism locking the housing member.

A first operation member is configured to a front end of the positioning member adjacent to the first prop pin. A first adjustment flange spirals around a section of an inner wall of the first operation member adjacent to the front end of the positioning member. The first adjustment flange's width gradually reduces as it gets close to the front end of the positioning member. A ring of first outer indentations and a ring of first inner indentations are arranged surrounding the first adjustment flange inside first operation member. The first outer and first inner indentations are interleaved.

A second operation member is configured to a rear end of the positioning member adjacent to the second prop pin. A second adjustment flange spirals around a section of an inner wall of the second operation member adjacent to the rear end of the positioning member. The width of the second adjustment flange gradually reduces as it gets close to the rear end of the positioning member. A ring of second outer indentations and a ring of second inner indentations are arranged surrounding the second adjustment flange inside second operation member. The second outer and second inner indentations are interleaved.

At least a first elastic positioning element and at least a second elastic positioning element axially are axially arranged side by side inside the positioning member. The first elastic positioning element has a first end and a second end embedded into one of the first and second inner indentations, respectively. The second elastic positioning element has a first end and a second end embedded into one of the first and second outer indentations, respectively.

Turning the first operation member may adjust the trajectory of the laser beam vertically. While turning the first operation member, the first and second elastic positioning elements have their ends embedded into successive second inner and outer indentations to achieve stepwise adjustment. In the meantime, the spiral first adjustment flange forces the laser member to shift gradually up or down to achieve fine vertical adjustment.

Similarly, turning the second operation member may adjust the trajectory of the laser beam laterally. While turning the second operation member, the first and second elastic positioning elements have their ends embedded into successive first inner and outer indentations to achieve stepwise adjustment. In the meantime, the spiral second adjustment flange forces the laser member to shift gradually left or right to achieve fine lateral adjustment.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
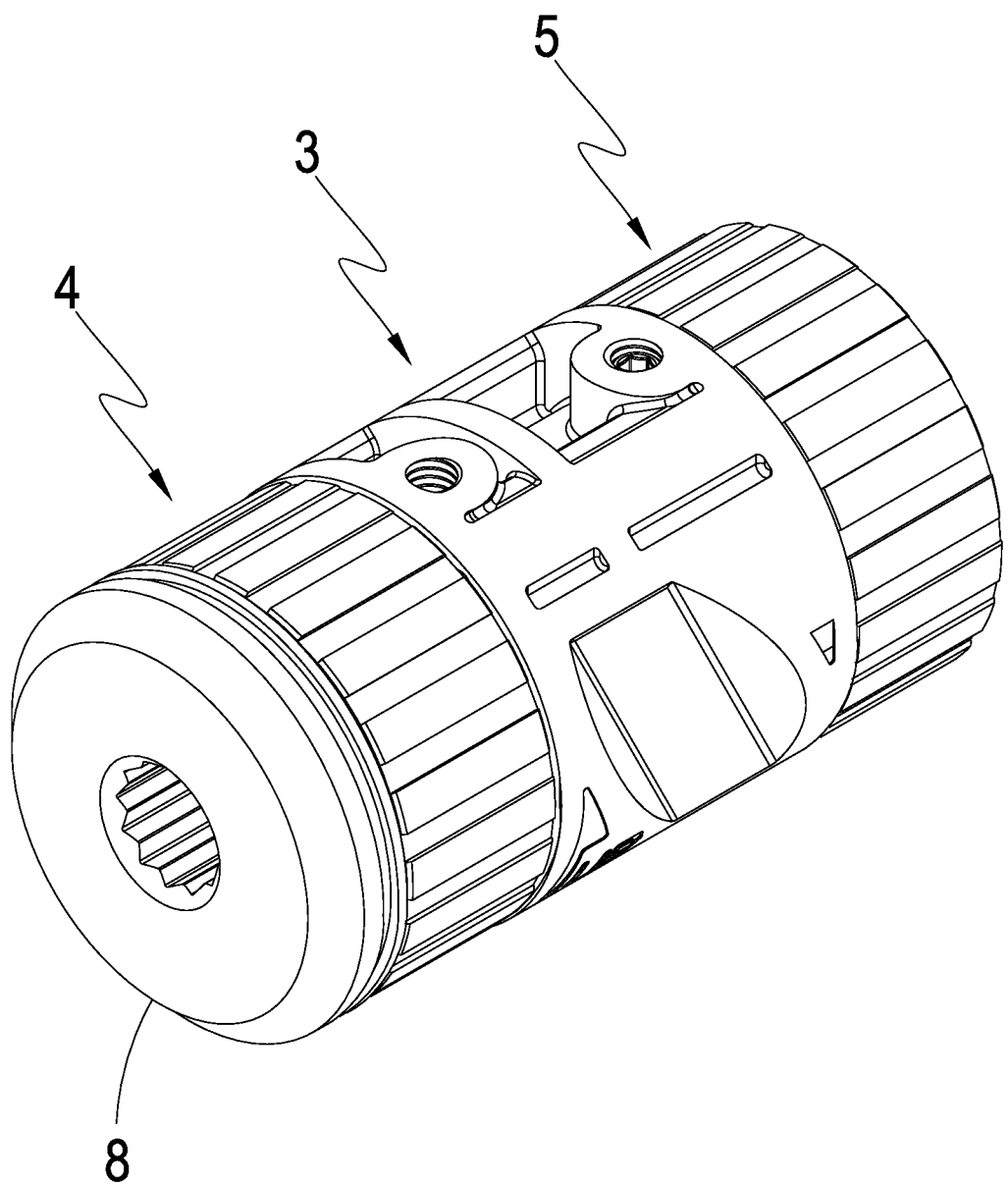
FIG. 1 is a perspective diagram showing a laser sighting device according to an embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 4A, a laser sighting device according to an embodiment of the present invention includes a laser member 1, a housing member 2, a positioning member 3, a first operation member 4, a second operation member 5, at least a first elastic positioning element 6, and at least a second elastic positioning element 7. The laser member 1 includes a laser lighting element 11 and a tubular sleeve 12 for accommodating the laser lighting element 11. In the present embodiment, the sleeve 12 includes a number of sleeve sections 121 and joining sections 122 assembled together for accommodating and positioning the laser member 1. A first prop pin 13 and a first support pin 15 are oppositely provided adjacent to a front end of the sleeve 12. A second prop pin 16 and a second support pin 18 are oppositely provided adjacent to a front end of the sleeve 12. A first elastic element 14 is positioned on the first support pin 15. An outer end of the first prop pin 13 has a first curved face 131 to facilitate sliding. A second prop pin 16 and a second support pin 18 are oppositely provided to a rear end of the sleeve 12. A second elastic element 17 is positioned on the second support pin 18. An outer end of the second prop pin 16 has a second curved face 161 to facilitate sliding. In the present embodiment, the first and second prop pins 13 and 16 are separated by 90 degrees, where the first prop pin 13 points upward and the second prop pin 16 points laterally.

The laser member 1 is moveably housed in the housing member 2. The housing member 2 has at least one axial slit 21 on the front end and at least one axial slit 21 on the rear end to receive the first and second prop pins 13 and 16, respectively. The housing member 2 is itself housed in the positioning member 3. The positioning member 3 includes a fastening mechanism 31 for locking the housing member 2, which has a corresponding limiting mechanism 22. The fastening mechanism 31 includes at least a first fastening element 311 and a second fastening element 312. Correspondingly, the limiting mechanism 22 includes at least a first limiting element 221 and at least a second limiting element 222, interacting with the first and second fastening elements 311 and 312, respectively. In the present embodiment, there are multiple first fastening elements 311, and multiple first limiting elements 221. For example, each first fastening element 311 is an axial trough along an inner wall of the positioning member 3, and each corresponding first limiting element 221 is an axial rib on a circumferential face of the housing member 2 for fitting into the first fastening element 311. The second fastening element 312 may be a through opening allowing a fastener 32 such as a bolt to thread through and engage the second limiting element 222 which may be a bolt hole.

The first operation member 4 is configured to a front end of the positioning member 3 adjacent to the first prop pin 13. Around the first operation member 4's circumference, there is at least an end-to-end, axially oriented first anti-slippery rib 44. Inside the first operation member 4, a first adjustment flange 41 spirals around a section of an inner wall of the first operation member 4 adjacent to the front end of the positioning member 3. The width of the first adjustment flange 41 gradually reduces as it gets close to the front end of the positioning member 3. The first curved face 131 is against the first adjustment flange 41, and the first elastic element 14 (e.g., a spring) against the housing member 2's inner wall. The laser member 1 therefore may be adjusted up and down by the first operation member 4 in the present embodiment.

Figure 4:
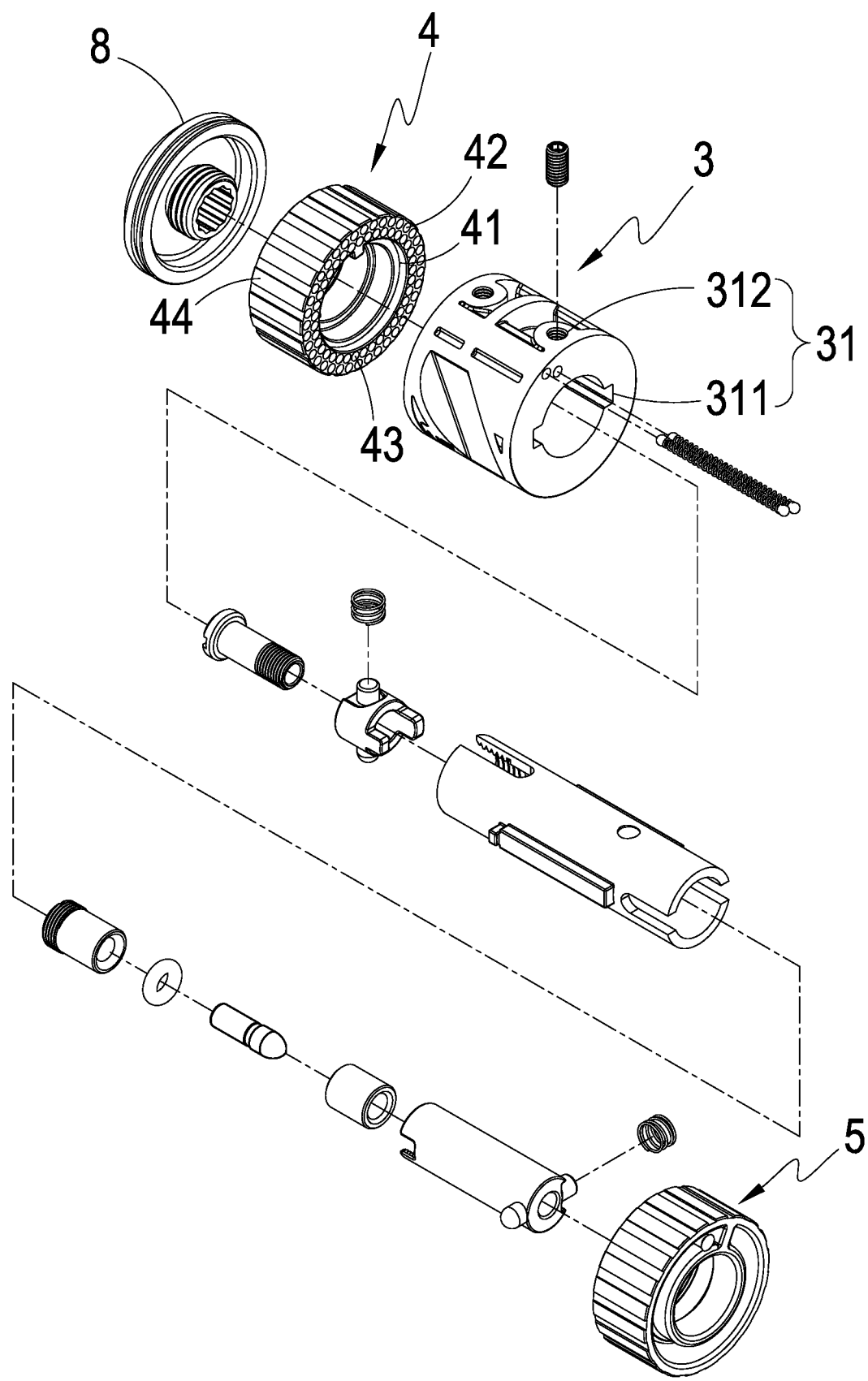
FIG. 4 is a perspective break-down diagram showing the laser sighting device of FIG. 1 from a different angle.
Figure 4A:
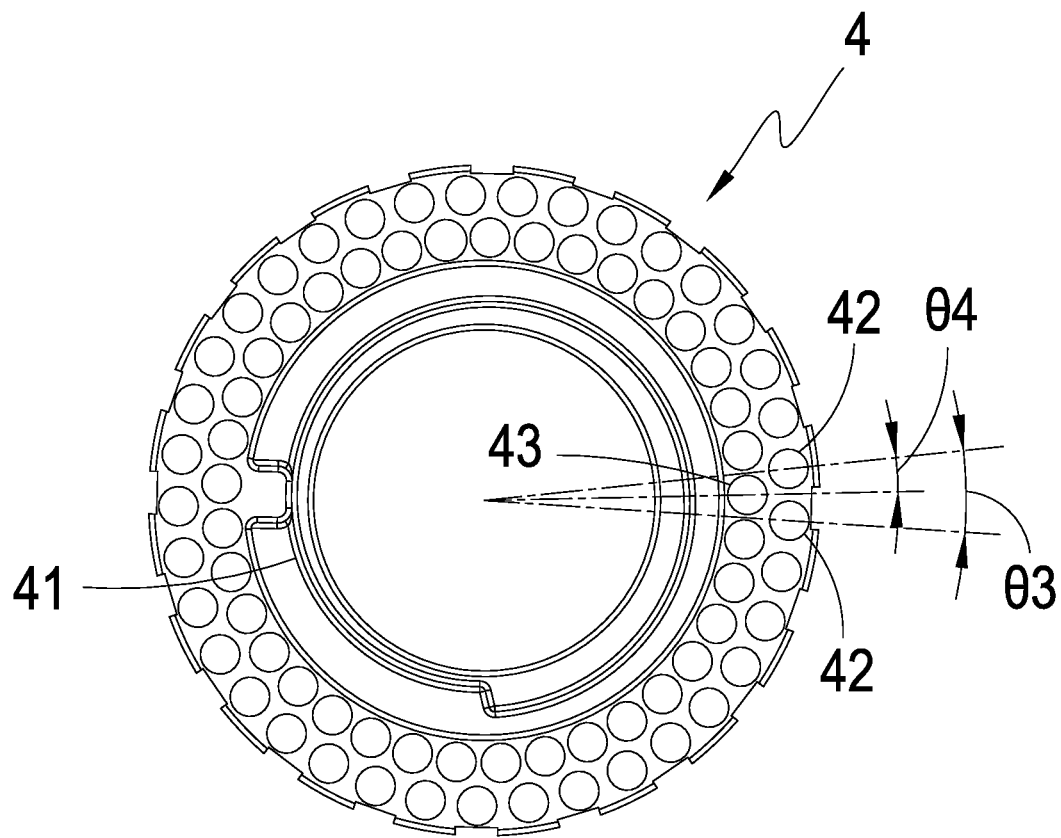
FIG. 4A is a cross-sectional diagram showing a first operation member of the laser sighting device of FIG. 1.

A ring of first outer indentations 42 and a ring of first inner indentations 43 are arranged surrounding the first adjustment flange 41 inside first operation member 4. The first outer and first inner indentations 42 and 43 are interleaved. For example, as shown in FIG. 4A, two neighboring first outer indentations 42 has an included angle θ3 from the axle of the first operation member 4 about 9 degrees. An first inner indentation 43 is positioned within this angle θ3, and has an included angle θ4 relative to any one of the two first outer indentations 42 about 4.5 degrees. The interleaving first outer and first inner indentations 42 and 43 provide finer degrees of adjustment.

The second operation member 5 is configured to a rear end of the positioning member 3 adjacent to the second prop pin 16. Around the second operation member 5's circumference, there is at least an end-to-end, axially oriented second anti-slippery rib 54. Inside the second operation member 5, a second adjustment flange 51 spirals around a section of an inner wall of the second operation member 5 adjacent to the rear end of the positioning member 3. The width of the second adjustment flange 51 gradually reduces as it gets close to the rear end of the positioning member 3. The second curved face 161 is against the second adjustment flange 51, and the second elastic element 17 (e.g., a spring) against the housing member 2's inner wall. The laser member 1 therefore may be adjusted left and right by the second operation member 5 in the present embodiment.

Figure 2:
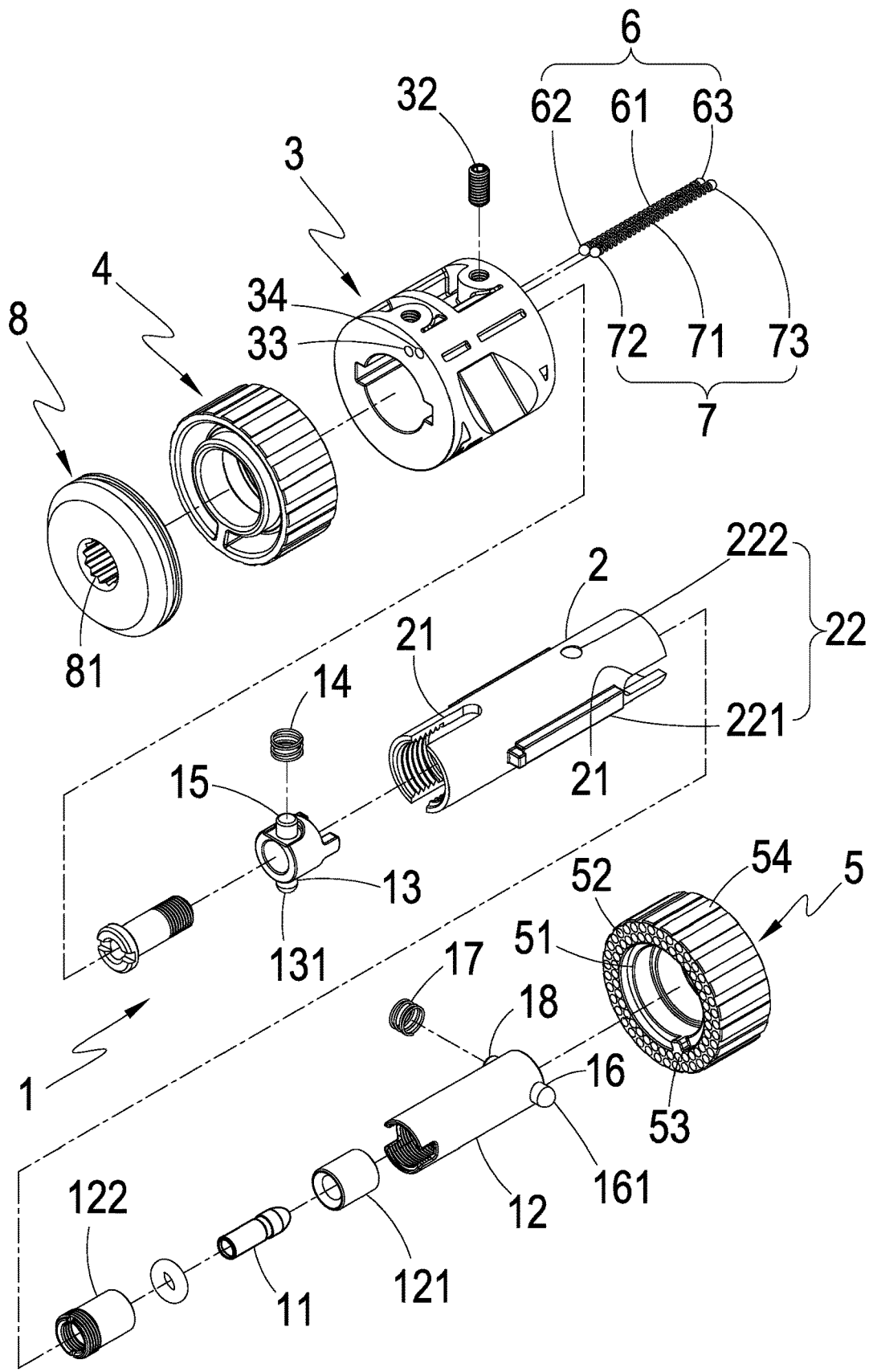
FIG. 2 is a perspective break-down diagram showing the laser sighting device of FIG. 1.
Figure 2A:
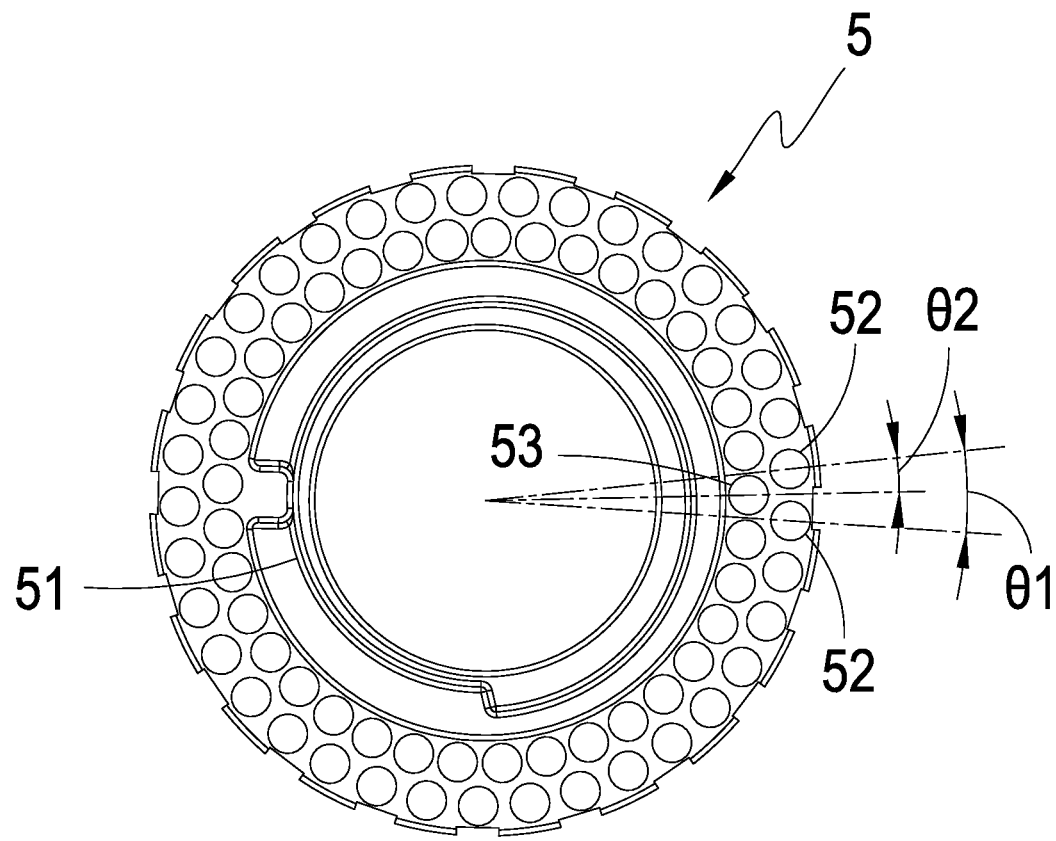
FIG. 2A is a cross-sectional diagram showing a second operation member of the laser sighting device of FIG. 1.
Figure 3:
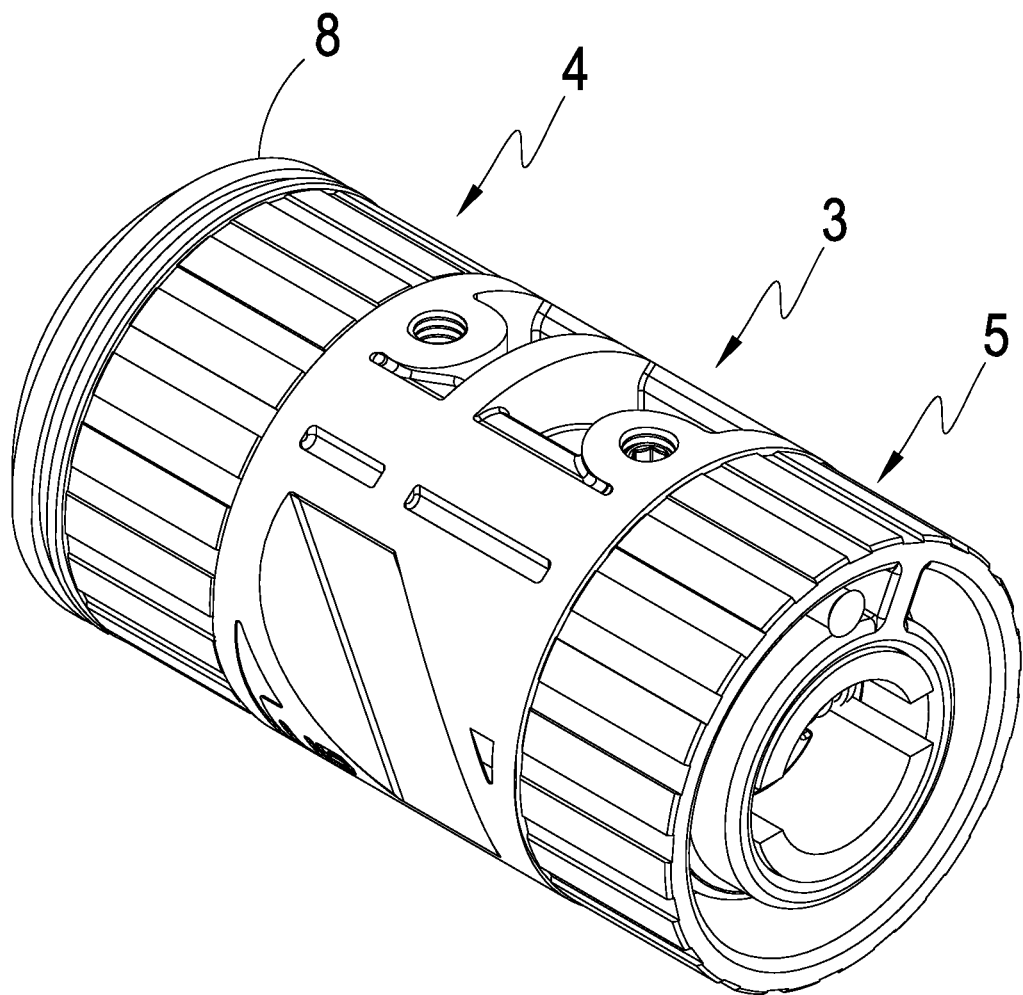
FIG. 3 is a perspective diagram showing the laser sighting device of FIG. 1 from a different angle.

A ring of second outer indentations 52 and a ring of second inner indentations 53 are arranged surrounding the second adjustment flange 51 inside second operation member 5. The second outer and second inner indentations 52 and 53 are interleaved. For example, as shown in FIG. 2A, two neighboring second outer indentations 52 has an included angle θ3 from the axle of the second operation member 5 about 9 degrees. An second inner indentation 53 is positioned within this angle θ1, and has an included angle θ2 relative to any one of the two second outer indentations 52 about 4.5 degrees. The interleaving second outer and second inner indentations 52 and 53 provide finer degrees of adjustment.

The positioning member 3 includes a first channel 33 and a second channel 34 for housing the first and second elastic positioning elements 6 and 7, respectively. The first and second channels 33 and 34 are end-to-end configured and axially aligned within the positioning member 3. In the present embodiment, the first and second elastic positioning elements 6 and 7 include first and second elastic pieces 61 and 71 (e.g., springs), first and second inner tips 62 and 63, first and second outer tips 72 and 73, respectively. At any one time, the first and second inner tips 62 and 63 are plugged into one of the first and second inner indentations 42 and 52. Similarly, the first and second outer tips 72 and 73 are plugged into one of the first and second outer indentations 43 and 53.

A cap 8 is configured to a front end of the first operation member 4. The cap 8 is joined to the housing member 2. The cap 8 has an axial channel 81 corresponding to the laser member 1.

Figure 5:
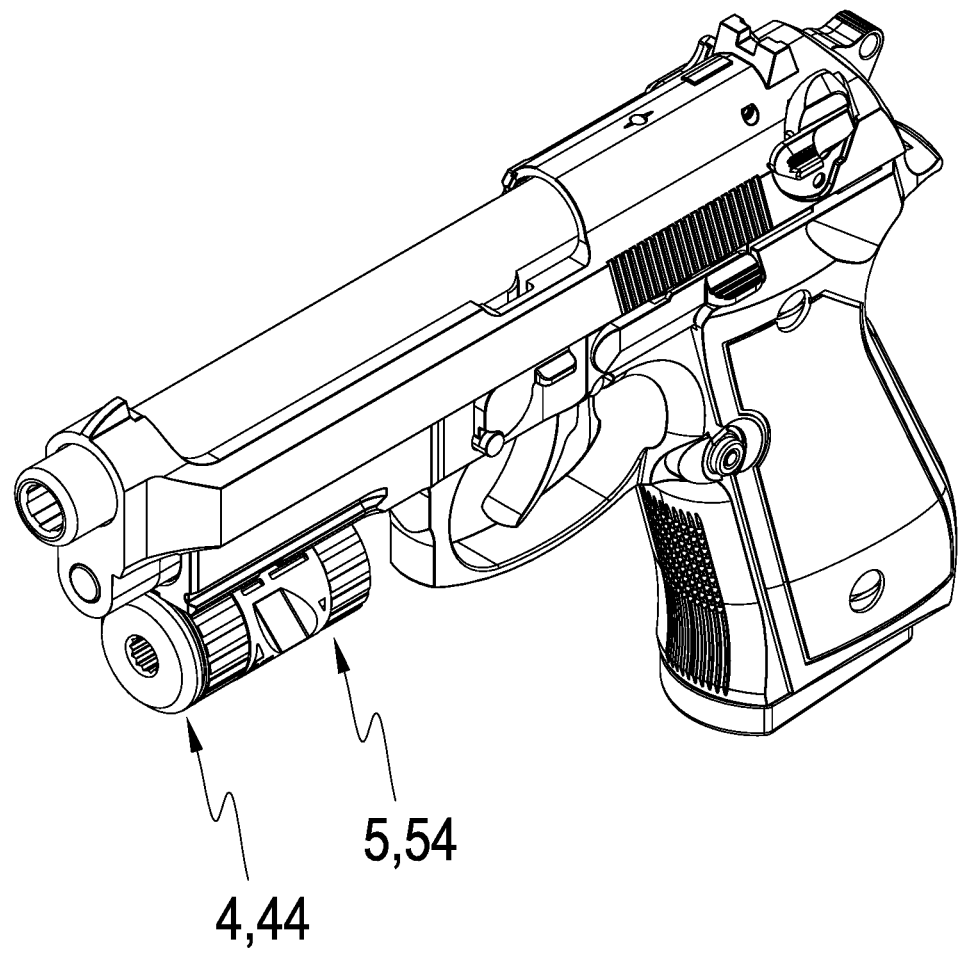
FIG. 5 is a perspective diagram showing the laser sighting device of FIG. 1 applied to a gun.

As shown in FIG. 1 to FIG. 9A, specifically FIG. 5, the laser sighting device of the present embodiment is configured to a gun barrel. The first and second anti-slippery ribs 44 and 54 facilitate twisting the first and second operation members 4 and 5 so that the laser beam from the laser lighting element 11 of the laser member 1 through the channel 81 of the cap 8 may be gradually and slightly adjusted to coincide with a bullet's impact point. The housing member 2 is reliably joined to the positioning member 3 by fitting first limiting elements 221 into first fastening elements 311, and running the fastener 32 through the second fastening element 312 to press the second limiting element 222.

Figure 6:
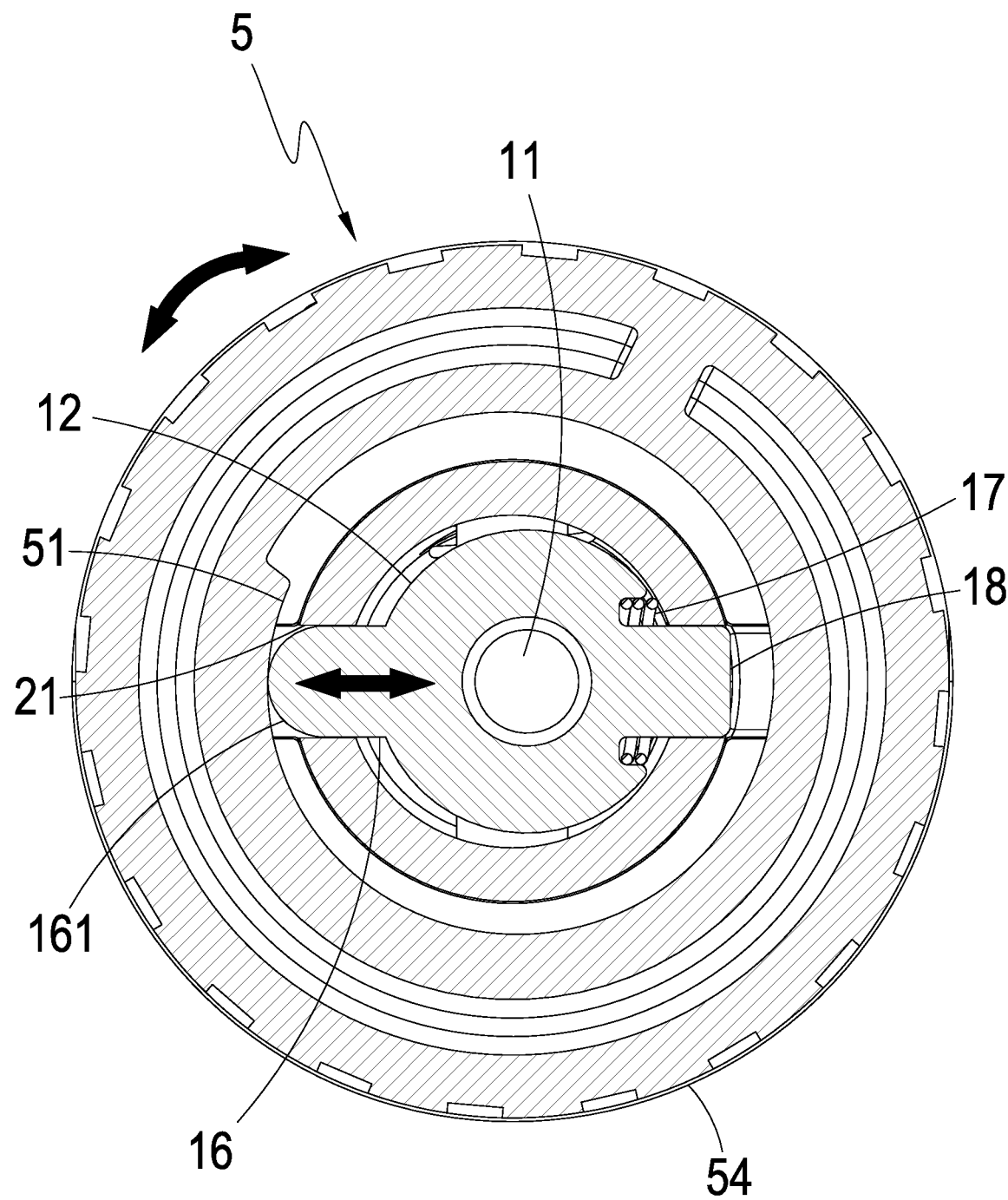
FIG. 6 is a schematic cross-sectional diagram showing a scenario of turning the second operation member of the laser sighting device of FIG. 2A.
Figure 6A:
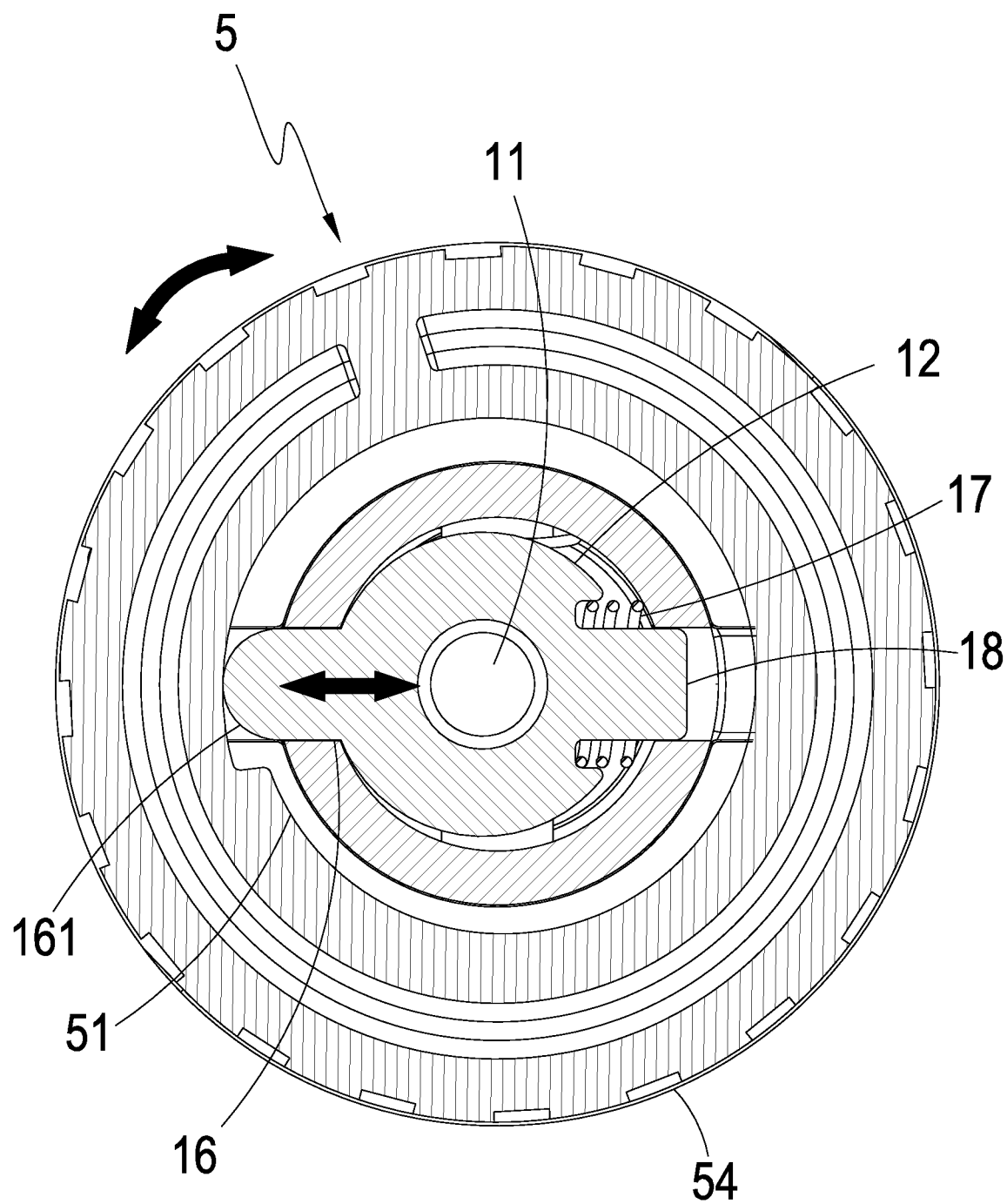
FIG. 6A is a schematic cross-sectional diagram showing another scenario of turning the second operation member of the laser sighting device of FIG. 2A.
Figure 7:
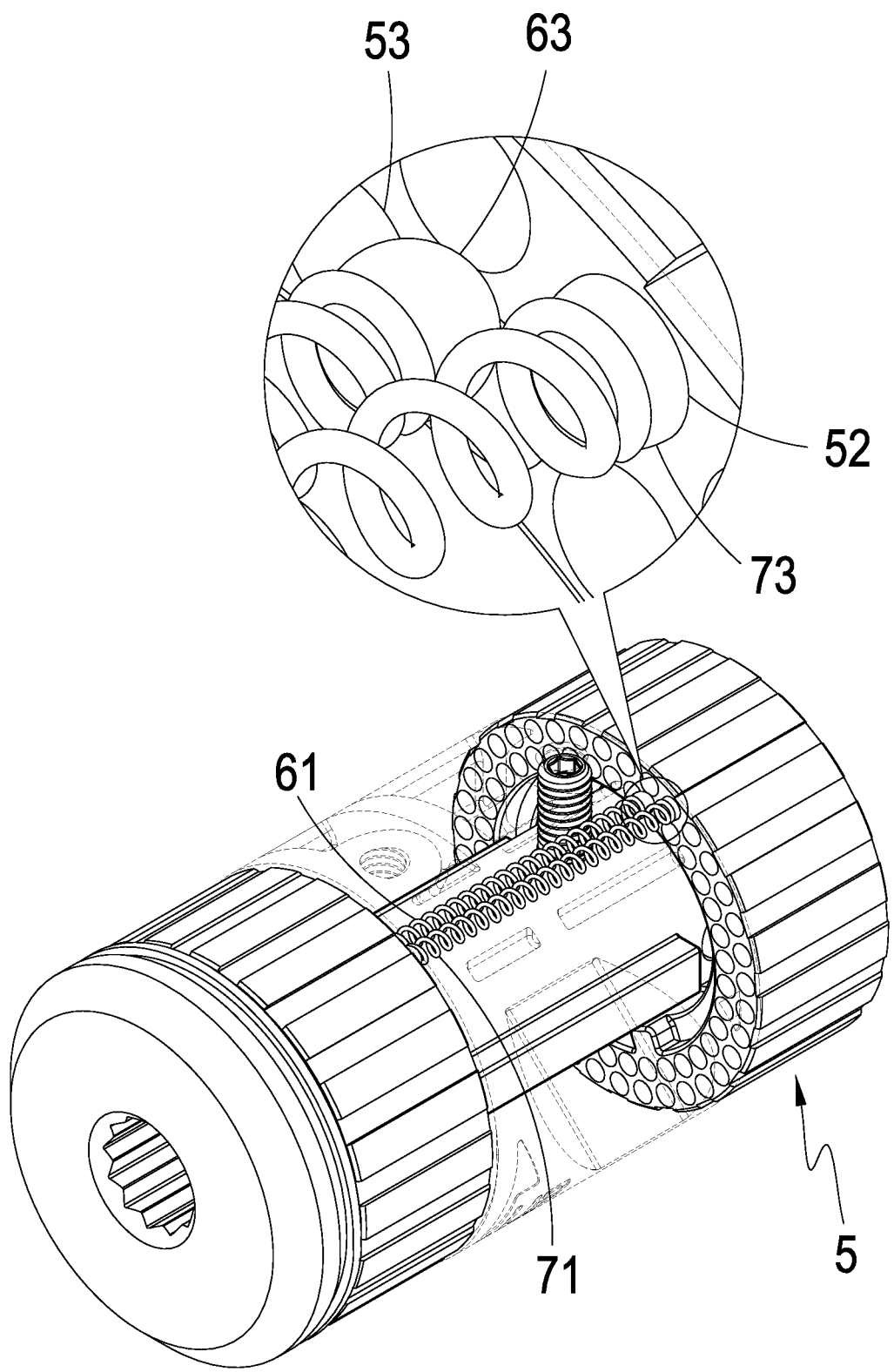
FIG. 7 is a schematic perspective diagram showing how the second operation member of the laser sighting device of FIG. 2A provides stepwise fine adjustment.
Figure 7A:
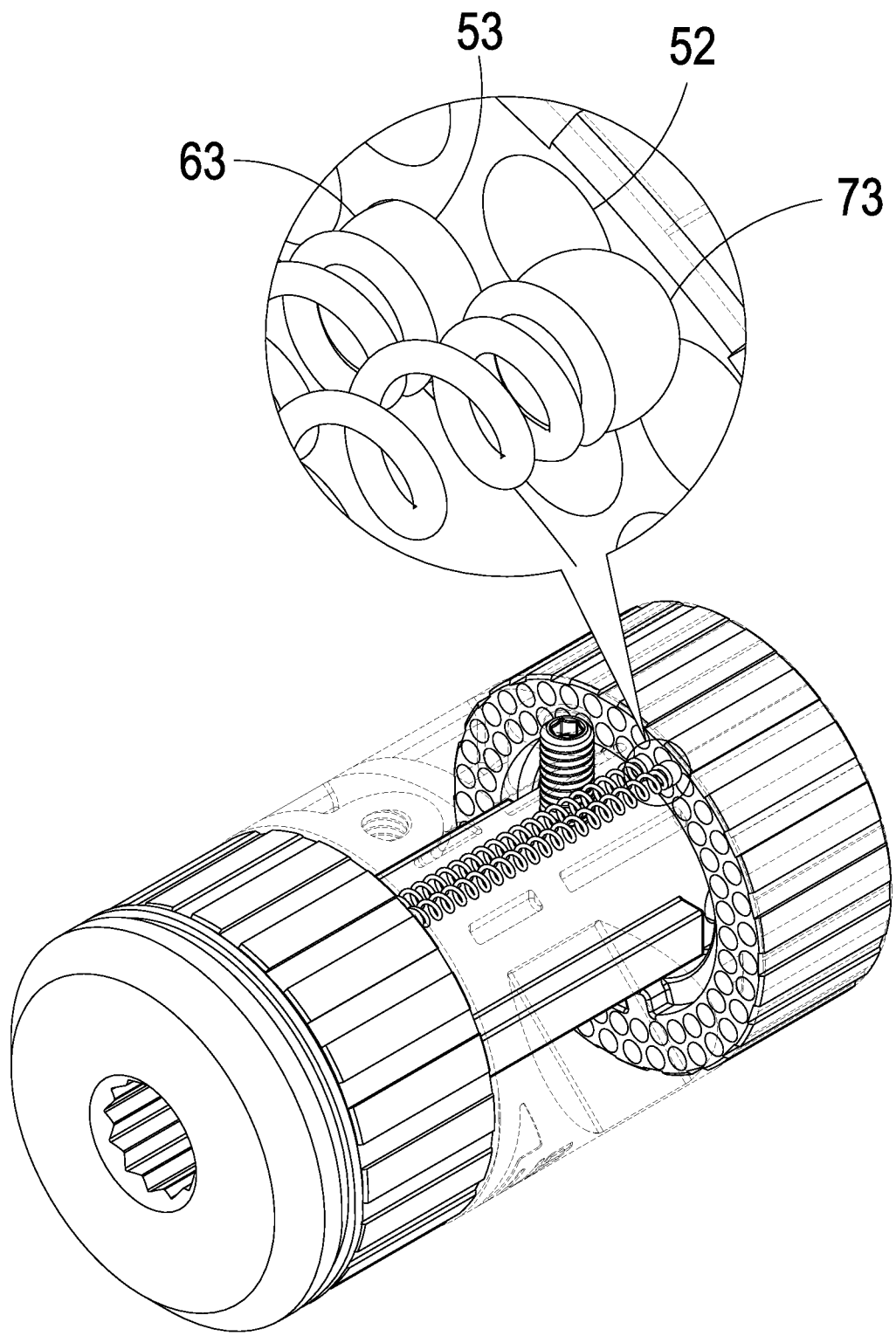
FIG. 7A is another schematic perspective diagram showing how the second operation member of the laser sighting device of FIG. 2A provides stepwise fine adjustment.

As shown in FIG. 6 to FIG. 7A, to adjust the trajectory of the laser beam laterally by turning the second operation member 5, as the second curved face 161 of the second prop pin 16 extends through the axial slit 21 and contacts with the second adjustment flange 51, the laser member 1 is moved to a side as the spiral second adjustment flange 51 gradually forces the second curved face 161 to shift laterally. In the meantime, the second elastic element 17 on the second support pin 18 is compressed or expands. While turning the second operation member 5, the second elastic positioning element 7 is compressed or expands in the second channel 34 so that the second outer tip 73 is embedded into successive second outer indentations 52 as shown in FIG. 7. Similarly, the first elastic positioning element 6 is compressed or expands in the first channel 33 so that the second inner tip 63 is embedded into successive second inner indentations 53 as shown in FIG. 7A. Therefore the laser sighting device of the present embodiment is able to provide fine lateral adjustment in multiple steps without using a tool.

Figure 8:
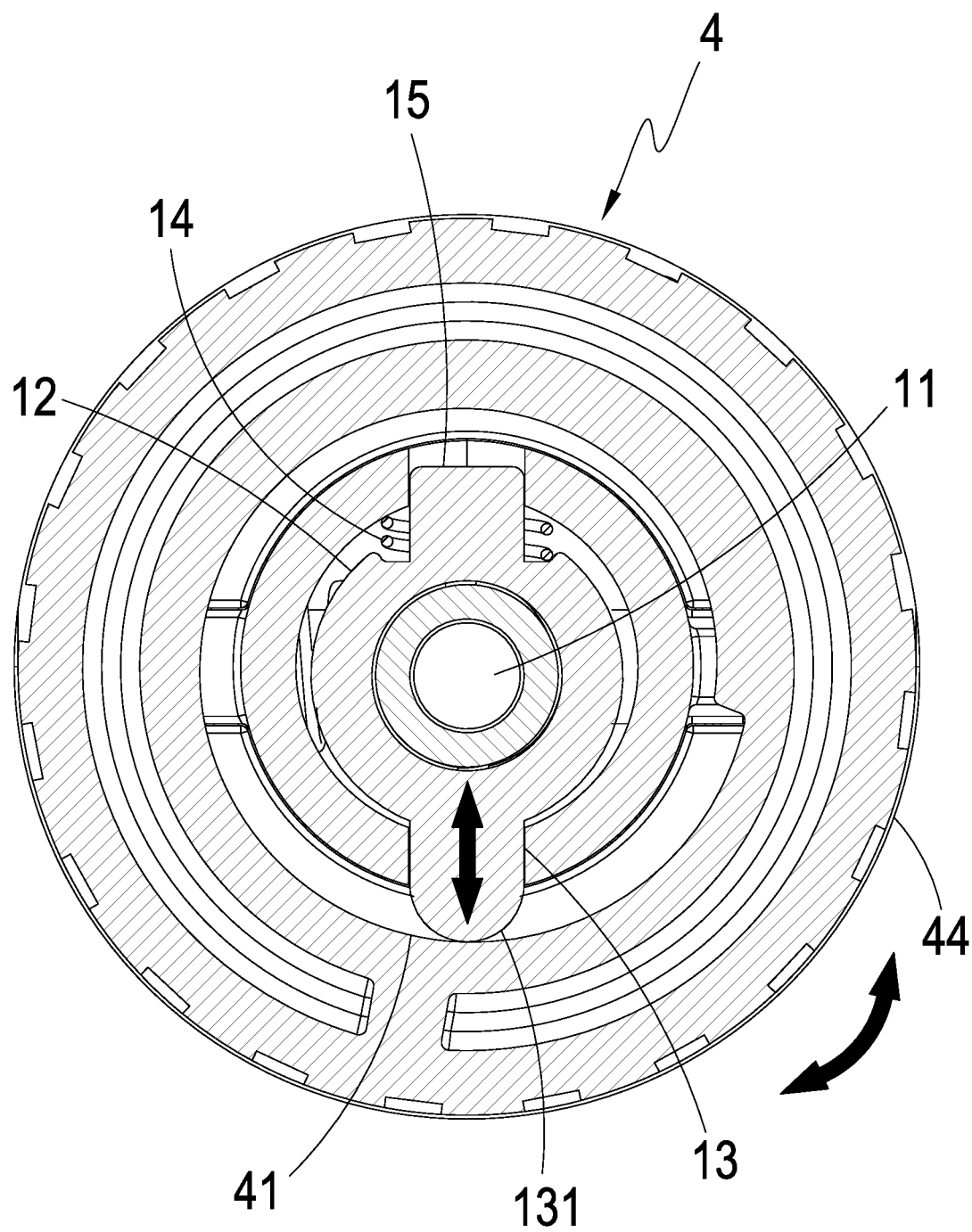
FIG. 8 is a schematic cross-sectional diagram showing a scenario of turning the first operation member of the laser sighting device of FIG. 4A.
Figure 8A:
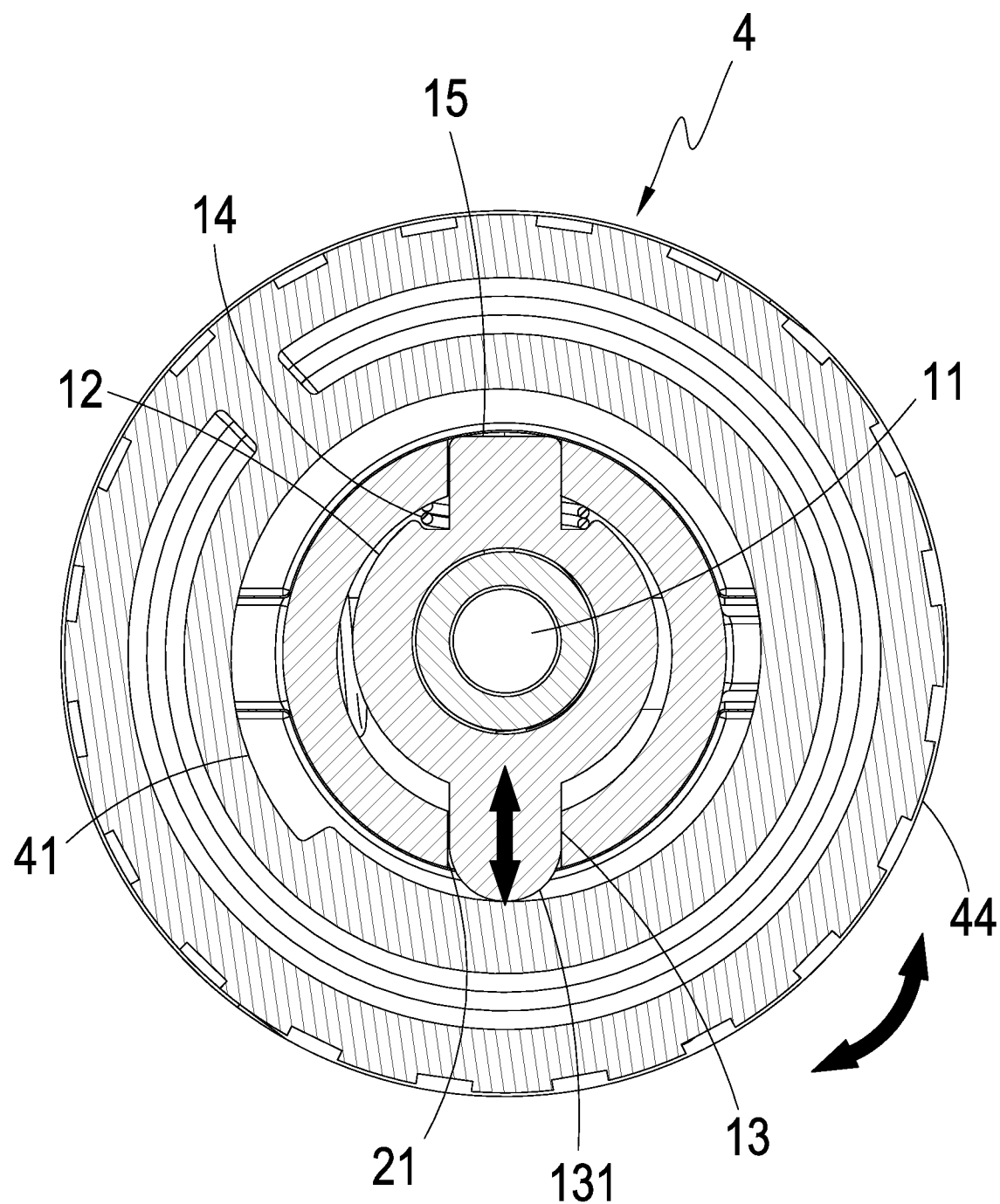
FIG. 8A is a schematic cross-sectional diagram showing another scenario of turning the first operation member of the laser sighting device of FIG. 4A.
Figure 9:
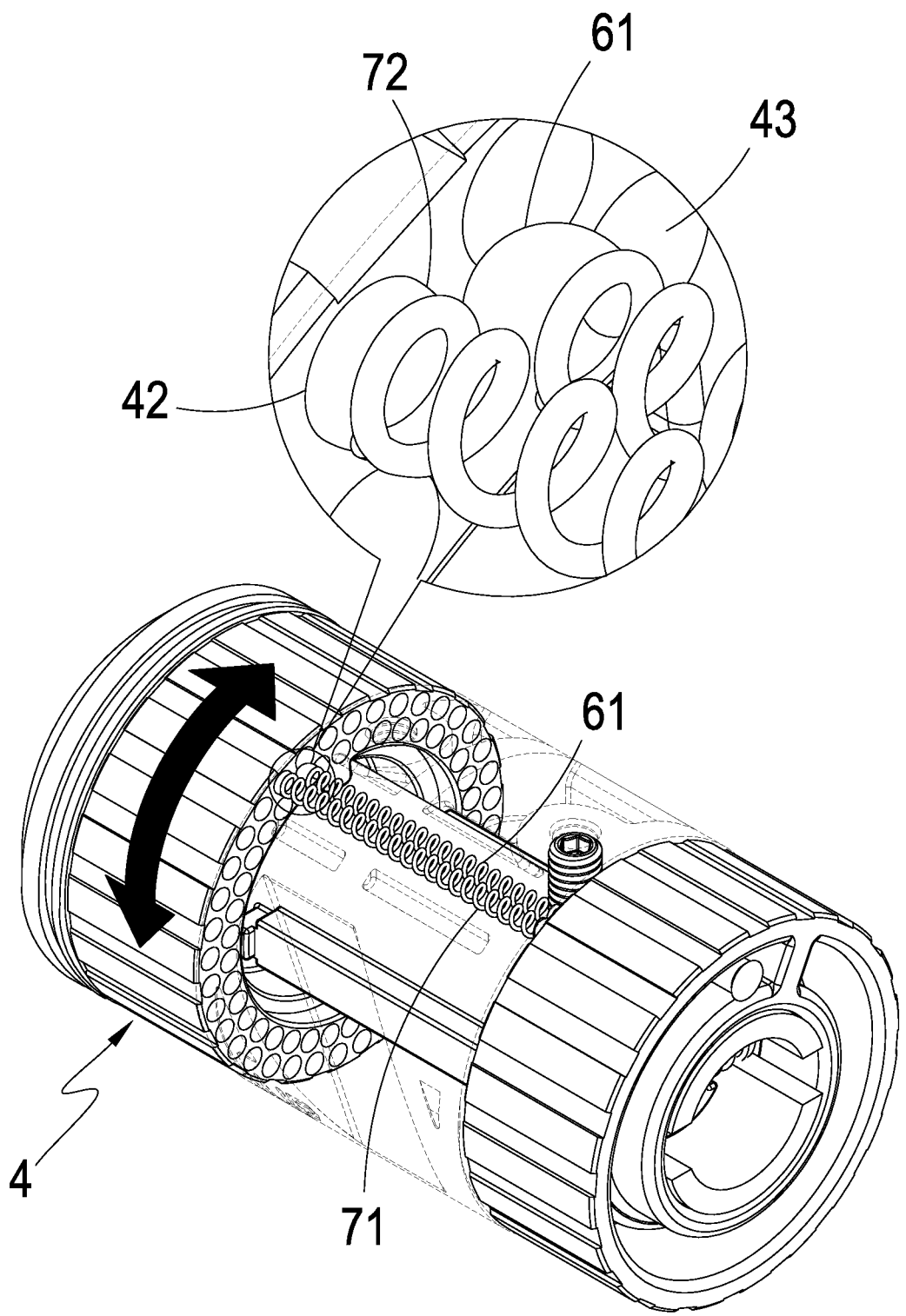
FIG. 9 is a schematic perspective diagram showing how the first operation member of the laser sighting device of FIG. 4A provides stepwise fine adjustment.
Figure 9A:
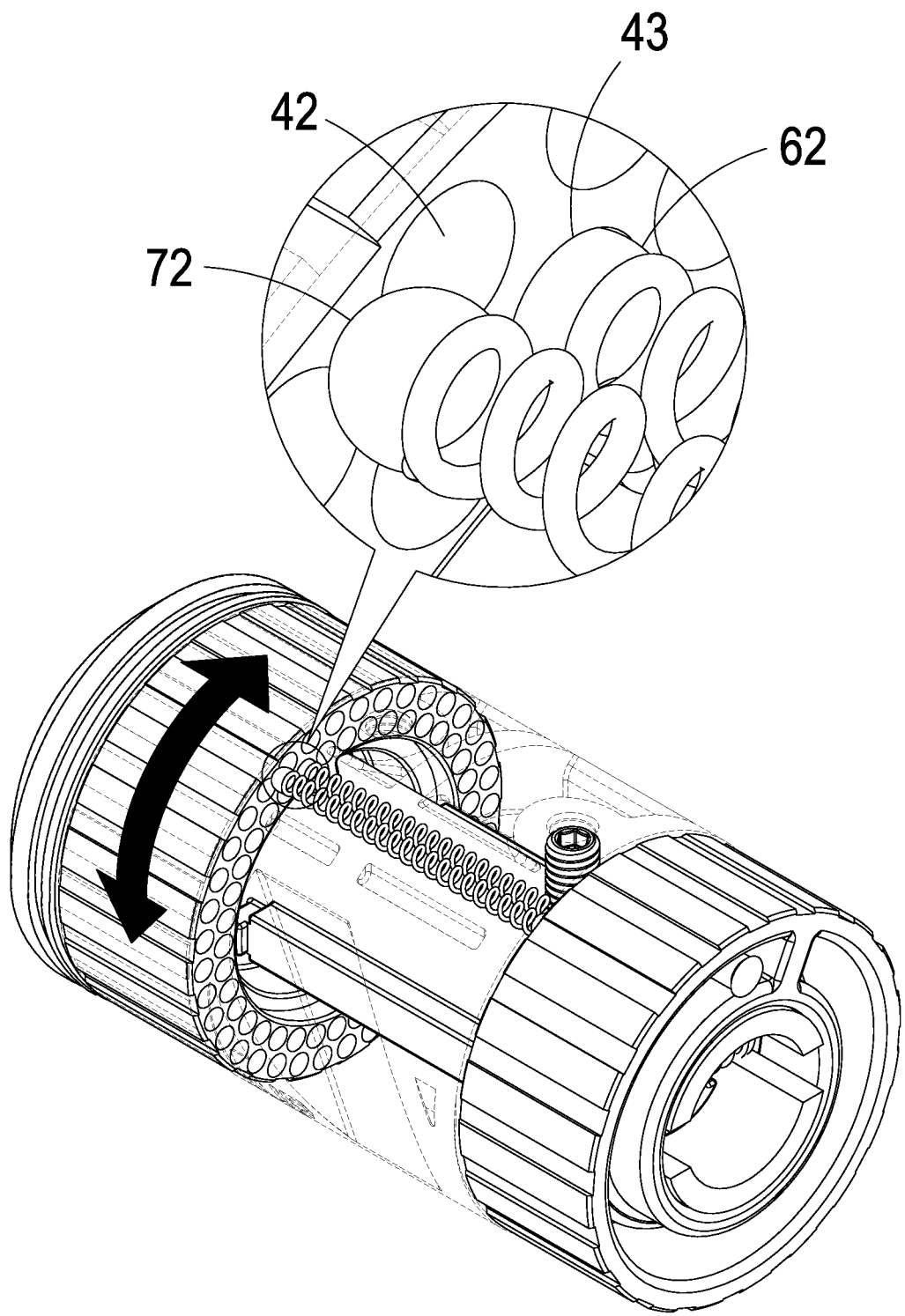
FIG. 9A is another schematic perspective diagram showing how the first operation member of the laser sighting device of FIG. 4A provides stepwise fine adjustment.

As shown in FIG. 8 to FIG. 9A, to adjust the trajectory of the laser beam vertically by turning the first operation member 4, as the first curved face 131 of the first prop pin 13 extends through the axial slit 21 and contacts with the first adjustment flange 41, the laser member 1 is moved up or down as the spiral first adjustment flange 41 gradually forces the first curved face 131 to shift vertically. In the meantime, the second elastic element 17 on the second support pin 18 is compressed or expands. While turning the first operation member 4, the second elastic positioning element 7 is compressed or expands in the second channel 34 so that the first outer tip 72 is embedded into successive first outer indentations 42 as shown in FIG. 9. Similarly, the first elastic positioning element 6 is compressed or expands in the first channel 33 so that the first inner tip 62 is embedded into successive first inner indentations 43 as shown in FIG. 9A. Therefore the laser sighting device of the present embodiment is able to provide fine vertical adjustment in multiple steps without using a tool.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A laser sighting device comprising:
    a laser member comprising a first prop pin and an opposing first elastic element positioned adjacent to a front end, and a second prop pin and an opposing second elastic element adjacent to a rear end, of the laser member;
    a housing member, where the laser member is moveably housed in the housing member;
    a positioning member comprising a fastening mechanism, where the housing member is housed in the positioning member and locked by the fastening mechanism;
    a first operation member connected to a front end of the positioning member adjacent to the first prop pin, where a first adjustment flange spirals around a section of an inner wall of the first operation member adjacent to the front end of the positioning member, a width of the first adjustment flange gradually narrows as the first adjustment flange spirals around the housing member, a ring of first outer indentations and a ring of first inner indentations are arranged surrounding the first adjustment flange inside the first operation member, and the first outer and first inner indentations are interleaved;
    a second operation member connected to a rear end of the positioning member adjacent to the second prop pin, where a second adjustment flange spirals around a section of an inner wall of the second operation member adjacent to the rear end of the positioning member, a width of the second adjustment flange gradually narrows as the second adjustment flange spirals around the housing member, a ring of second outer indentations and a ring of second inner indentations are arranged surrounding the second adjustment flange inside the second operation member, and the second outer and second inner indentations are interleaved;
    at least a first elastic positioning element axially arranged inside the positioning member, having a first end and a second end embedded into one of the first and second inner indentations, respectively; and
    at least a second elastic positioning element axially arranged inside the positioning member, having a first end and a second end embedded into one of the first and second outer indentations, respectively.

2. The laser sighting device according to claim 1, wherein the laser member comprises a laser lighting element and a tubular sleeve accommodating the laser lighting element.

3. The laser sighting device according to claim 1, wherein the first and second prop pins are separated by 90 degrees.

4. The laser sighting device according to claim 1, wherein the first elastic positioning element comprises a first elastic piece, a first inner tip at the first end, and a second inner tip at the second end; the first and second inner tips are embedded into one of the first and second inner indentations, respectively; the second elastic positioning element comprises a second elastic piece, a first outer tip at the first end, and a second outer tip at the second end, respectively; the first outer tip and the second outer tip are embedded into one of the first and second outer indentations, respectively.

5. The laser sighting device according to claim 1, wherein the housing member has at least one axial slit on the front end and at least one axial slit on the rear end to receive the first and second prop pins; an outer end of the first prop pin has a first curved face; and an outer end of the second prop pin has a second curved face.

6. The laser sighting device according to claim 1, wherein the housing member has a limiting mechanism shape-compatible with the fastening mechanism.

7. The laser sighting device according to claim 1, wherein the fastening mechanism comprises at least a fastening element; and the housing member comprises at least a limiting element shape-compatible with the fastening element.

8. The laser sighting device according to claim 1, wherein at least an end-to-end, axially oriented first anti-slip rib is configured on a circumference of the first operation member; and at least an end-to-end, axially oriented second anti-slip rib is configured on a circumference of the second operation member.

9. The laser sighting device according to claim 1, wherein the laser member further comprises a first support pin and a second support pin wherein the first elastic element is positioned on the first support pin; and the second elastic element is positioned on the second support pin.

10. The laser sighting device according to claim 1, further comprising a cap connected to a front end of the first operation member wherein the cap is joined to the housing member; and the cap has an axial channel corresponding to the laser member.

\* \* \* \* \*